(No Model.)

J. A. PAHLMANN.
WAGON BRAKE.

No. 538,930. Patented May 7, 1895.

Witnesses

Inventor
John A. Pahlmann
By Chas. J. Gooch
Attorney

UNITED STATES PATENT OFFICE.

JOHN ALBERT PAHLMANN, OF NEW TEXAS, PENNSYLVANIA.

WAGON-BRAKE.

SPECIFICATION forming part of Letters Patent No. 538,930, dated May 7, 1895.

Application filed October 2, 1894. Serial No. 524,725. (No model.)

*To all whom it may concern:*

Be it known that I, JOHN ALBERT PAHLMANN, a citizen of the United States, residing at New Texas, in the county of Allegheny and State of Pennsylvania, have invented certain new and useful Improvements in Wagon-Brakes; and I do hereby declare the following to be a full, clear, and exact description of the invention, such as will enable others skilled in the art to which it appertains to make and use the same.

This invention relates to improvements, as hereinafter set forth, in brakes for wagons and similar vehicles.

Figure 1:
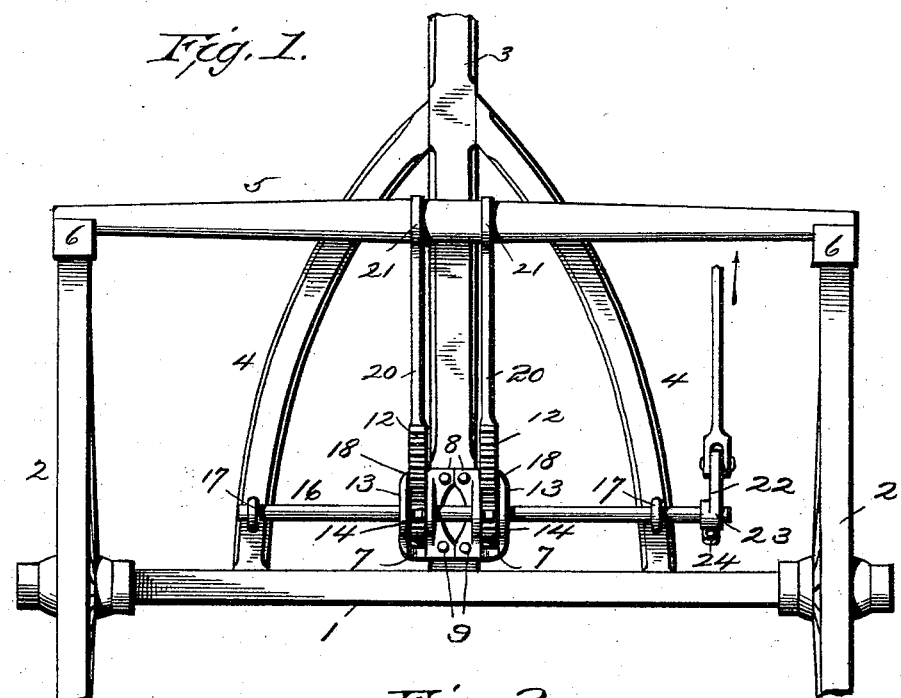
Figure 2:
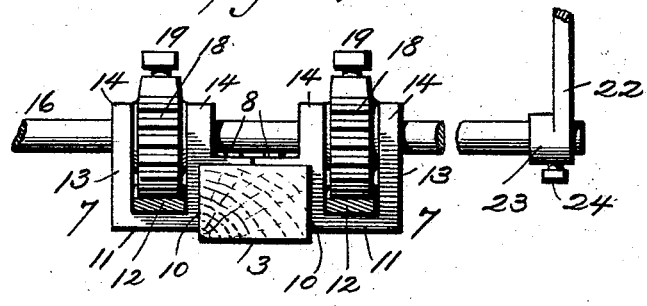
Figure 3:
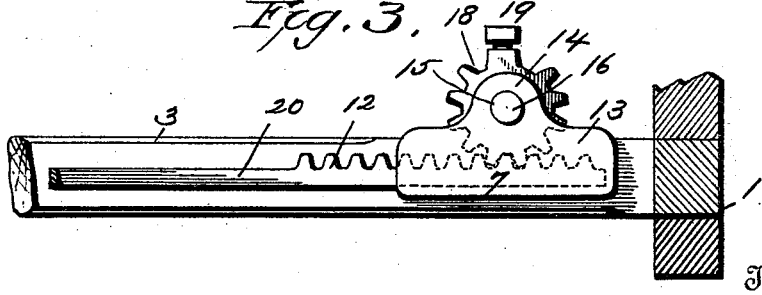

In the drawings, Figure 1 represents a top plan view of a portion of the running-gear of a wagon with my improvements in position. Fig. 2 represents a rear elevation. Fig. 3 represents a side elevation.

1 represents the rear axle, 2 the rear wheels, 3 the reach, 4 the hounds, 5 the brake-bar, and 6 the brake-blocks, all of which may be of ordinary construction.

7 represents a casting or shoe, of which there are two for each brake to be operated, disposed on opposite sides of the reach, as will presently appear, and as shown in the drawings. This shoe, 7, has at its upper portion an outwardly-extending flange, or flanges, 8, which, in use, rest against and by means of screws, bolts, or their equivalents, passed through holes, 9, in said flange are attached to either the sides or upper side edges of the reach, one on each side thereof, the straight-walled sides, 10, 13, of said shoe depending from the sides of the reach as shown.

11 represents the bottom, or floor, of the shoe along which a toothed or notched slide, 12, to be presently described, slides, the outer side wall, 13, of said shoe serving, in connection with the inner side wall, 10, to guide said slide in its reciprocal movements and insure the steadiness of movement thereof. Centrally of the side walls, 10, 13, of the shoe are upwardly-extending ears, 14, transversely bored, as at 15, to receive and afford bearing support to an operative shaft, 16, which extends transversely through the respective ears, 14 of the shoes, 7, located on opposite sides of the reach, 3, and through sockets or staples, 17, on the top of the reach, said sockets or staples being intended to prevent any possibility of lateral motion of the shaft, 16, at its ends.

It will be observed that the shoes are interchangeable, and that either can be attached to either side of the reach by means of the flange, 8, carried by each shoe. 18 represents toothed wheels which are mounted on the operative shaft, 16, at that portion thereof located between the ears, 14, of the respective shoes, said toothed wheels and shaft being removably and adjustably connected together by set screws, 19, or equivalent means. The mode of application of said shaft and toothed wheels will be readily understood. The toothed wheels are placed between the ears, 14, the shaft passed through said sockets or staples, 17 and through the ears, 14, and through the central bores of the toothed wheels and secured in position by the set screws 19. The toothed or notched slides, 12, with which the toothed wheels, 18, engage as shown, are preferably of a width equaling, or nearly so, the width of the respective shoes so that as said slides are, by the operation of the toothed wheels, slid back and forth in said shoes in the putting on or taking off of the brake, the reciprocal movements of said slides shall be steady and free from lateral oscillation. To the forward portions of said slides, or formed integral therewith as may be desired, are attached the rear ends of rods or straps, 20, the forward ends, 21, of which are attached in any suitable manner to the brake bar, 5, so that, as the operative shaft, 16, is rocked in its bearings and the thereto-connected toothed wheels, 18, are rotated, or partly rotated, the toothed slides, 12, and the thereto-connected rods or straps, 20, will be correspondingly reciprocated and draw with them the brake bar and thus either bring the brake-blocks into or release them from engagement with the wheels of the vehicle.

22 represents the shaft-operating lever. This has an eyed lower end, 23, which is slid over the shaft and is secured thereto so as to be adjustable to any portion of the length of the shaft, 16, or to be placed at either end thereof as may be desired, by a set screw, 24, passing through a threaded hole in said eyed end and gripping the shaft, as will be readily understood.

By the use of the construction and arrangement above set forth, I secure a direct draft straight in line with the brake bar. There is no lost motion, by reason of the leverage power positively exerted by the cogs and toothed bars and an equal and positive pressure is brought to bear upon both wheels of the vehicle at the same moment.

Having thus described my invention, what I claim is—

1. A brake for wagons and the like, consisting of a brake bar and brake blocks, U-shaped shoes each having upwardly-extending, eyed, side flanges or walls and a horizontal bottom plate and attached to the outer sides of the reach, toothed slides carried by and having reciprocal guide bearing in said shoes and having connection with the brake bar, a shaft having transverse bearing in the eyed portions of said shoes, toothed wheels mounted on said shaft and engaging with said toothed slides, and an operative lever connected with said shaft, substantially as and for the purpose set forth.

2. In a brake for vehicles, a U-shaped shoe adapted to be attached to the outer side faces of the reach said shoe having a longitudinal bottom plate and constituting a slide bearing, upwardly-extending slide-guiding side flanges or walls and transversely-bored and upwardly-extending ears constituting transverse shaft bearings, a toothed slide supported by and having reciprocal guide bearing on said bottom plate and between the vertical flanges of said shoe, a strap or rod connecting said slide and the brake bar of the vehicle, a toothed wheel engaged with said toothed slide, a shaft rigidly connected with said toothed wheel, and a lever for actuating said shaft, substantially as and for the purpose set forth.

3. A brake for wagons and the like, consisting of a brake bar and brake blocks, a pair of substantially U-shaped shoes having upwardly-extending side walls, and a longitudinal bottom plate said shoes being attached to and depending from the respective sides of the reach, toothed slides located and adapted to reciprocate within said walled shoes, a shaft having transverse bearing in said shoes, toothed wheels mounted on and secured to said shaft to engage with said toothed slides, rods connecting said slides and the brake bar, and a lever having an eyed lower end mounted on and adjustably attached to said shaft, substantially as and for the purpose set forth.

In testimony whereof I affix my signature in presence of two witnesses.

JOHN ALBERT PAHLMANN.

Witnesses:
JAMES GRIERSON,
ANDREW CLEMENTS.